United States Patent [19]

Telford

[11] 4,222,472
[45] Sep. 16, 1980

[54] FULLY AUTOMATIC ROLLER LOCKING HUB

[75] Inventor: Thomas M. Telford, Gladstone, Oreg.

[73] Assignee: Warn Industries, Inc., Kent, Wash.

[21] Appl. No.: 901,149

[22] Filed: Apr. 28, 1978

[51] Int. Cl.$^2$ .............. F16D 15/00; F16D 41/06
[52] U.S. Cl. .................... 192/36; 192/38; 192/44; 192/50
[58] Field of Search .......... 192/35, 36, 38, 44, 192/45, 50; 180/44 R

[56] References Cited

U.S. PATENT DOCUMENTS

| | | | |
|---|---|---|---|
| 3,123,169 | 3/1964 | Young et al. | 192/36 X |
| 3,217,847 | 11/1965 | Petrak | 192/114 X |
| 3,414,096 | 12/1968 | Reed | 192/44 X |
| 3,656,598 | 4/1972 | Goble | 192/35 |
| 3,788,435 | 1/1974 | Prueter | 192/35 |

FOREIGN PATENT DOCUMENTS 461410 5/1928 Fed. Rep. of Germany .......... 192/50

Primary Examiner—Allan D. Herrmann
Attorney, Agent, or Firm—Graybeal & Uhlir

[57] ABSTRACT

A clutch adapted for use in a four-wheel drive vehicle or the like and between concentric driving and driven members having a plurality of axially extending grooves opening radially toward the other member. A plurality of rollers are disposed within the grooves. Torque responsive means moves the rollers radially out of the grooves to one edge thereof and into contact with the driven member, thereby locking the driven member to the driving member whenever the driving member rotates faster or slower than the driven member. Means responsive to the driven member rotation displaces the rollers from one edge of the grooves to a position on the opposite edge of the grooves and into re-engagement with the driven member, thereby locking the driven member to the driving member whenever the driving member attempts to rotate slower than the driven member.

8 Claims, 6 Drawing Figures

FULLY AUTOMATIC ROLLER LOCKING HUB

BACKGROUND OF THE INVENTION

1. Field of the Invention

This invention relates to a clutch means and more particularly to a roller type locking clutch especially adapted for use in a four-wheel drive vehicle or the like.

2. Description of the Prior Art

During operation of a four-wheel drive vehicle or the like, it is desirable that the front wheels of the vehicle can disconnect with respect to respective driving members such as the front axle shafts or the like of the vehicle. In this manner, the front wheels are in a free-run or free-wheeling relationship with the driving member. At other times, it becomes desirable to automatically lock the front wheels to the respective driving members whenever the driving members are rotated. Typical automatic clutch means which lock the front wheels to respective driving members have an inherent problem in that, as the driving member rotates slower than the front wheels, as occurs when the throttle of the vehicle is suddenly released or the vehicle descends a downgrade, the clutch means allow the front wheels to free-run with respect to the driving members. The present invention overcomes this problem by automatically maintaining the front wheels and the respective driving members in a locked relationship whenever the driving members are rotating. In this manner the normal vehicle engine compression is used to brake the speed of the vehicle through front and rear wheels as the vehicle throttle is released or as the vehicle descends a downgrade.

Petrak U.S. Pat. No. 3,217,847, disclosed an automatic clutch with a locking means but differs from the present invention in that in the Petrak clutch a clutch ring is axially displaced into a splined engagement with a driven member. Goble U.S. Pat. No. 3,656,598, discloses a clutch which is somewhat similar to the Petrak clutch and differs from the present invention in that it also uses a sliding clutch ring to lock the driving and driven members. Reed U.S. Pat. No. 3,414,096, discloses an automatic and manual means for a hub clutch, but differs from the present invention in that it requires a manually operated mechanism to provide engine compression braking.

As will be discussed more fully below, the present invention provides a means to automatically lock a driving member to a driven member for any relatively unequal rotation of the driven member. As the driven member overruns the driving member, as occurs when the throttle of the vehicle is released, means within the clutch automatically maintain a locked engagement between the driving and driven members, thereby allowing the engine compression to brake the forward speed of the vehicle through both front and rear wheels.

SUMMARY OF THE INVENTION

According to one aspect of the present invention, a clutch for use between concentric driving and driven members, with one of the members having a plurality of axially extending grooves opening radially toward the other member and having a plurality of rollers disposed therein, comprises a torque responsive means which moves the rollers radially out of the valleys of the grooves and onto one edge of the grooves and into contact with the driven member. The rollers are thereby engaged between the driving and driven member, locking the driven member to the driving member whenever the driving member rotates. Means responsive to the driven member relative rotation displaces the rollers from one edge of the grooves to a position on the opposite edge of the grooves and into re-engagement with the driven member, thereby locking the driven member to the driving member whenever the driving member attempts to rotate slower than the driven member. It is a significant feature and advantage and driven members maintain a locked engagement with respect to each other for any rotational movement of the driving member, particularly when the driving member attempts to rotate slower than the driven member, as occurs when the throttle of the vehicle is released. In this manner, compression drag within the engine can assist vehicle braking through the front wheels as well as the rear.

The foregoing and other objects, features and advantages of the present invention will become more apparent in the light of the foregoing detailed description of a preferred embodiment thereof as illustrated in the accompanying drawings.

DESCRIPTION OF THE PREFERRED EMBODIMENTS

Roller type locking clutches according to the present invention are disposed at opposite ends and coaxially around the tip portions of the front axle shafts of a four-wheel drive vehicle or the like, and within the removal wheel hubs thereon. As will be described more fully below, locking clutches of the present invention lock the respective front axle shafts to the respective wheel hubs whenever the front axle shafts rotate, either in the clockwise or counterclockwise direction, and permit free rotation of the wheel hubs with respect to the axle shafts when the axle shafts are disengaged from drivetrain rotation.

Figure 1A:
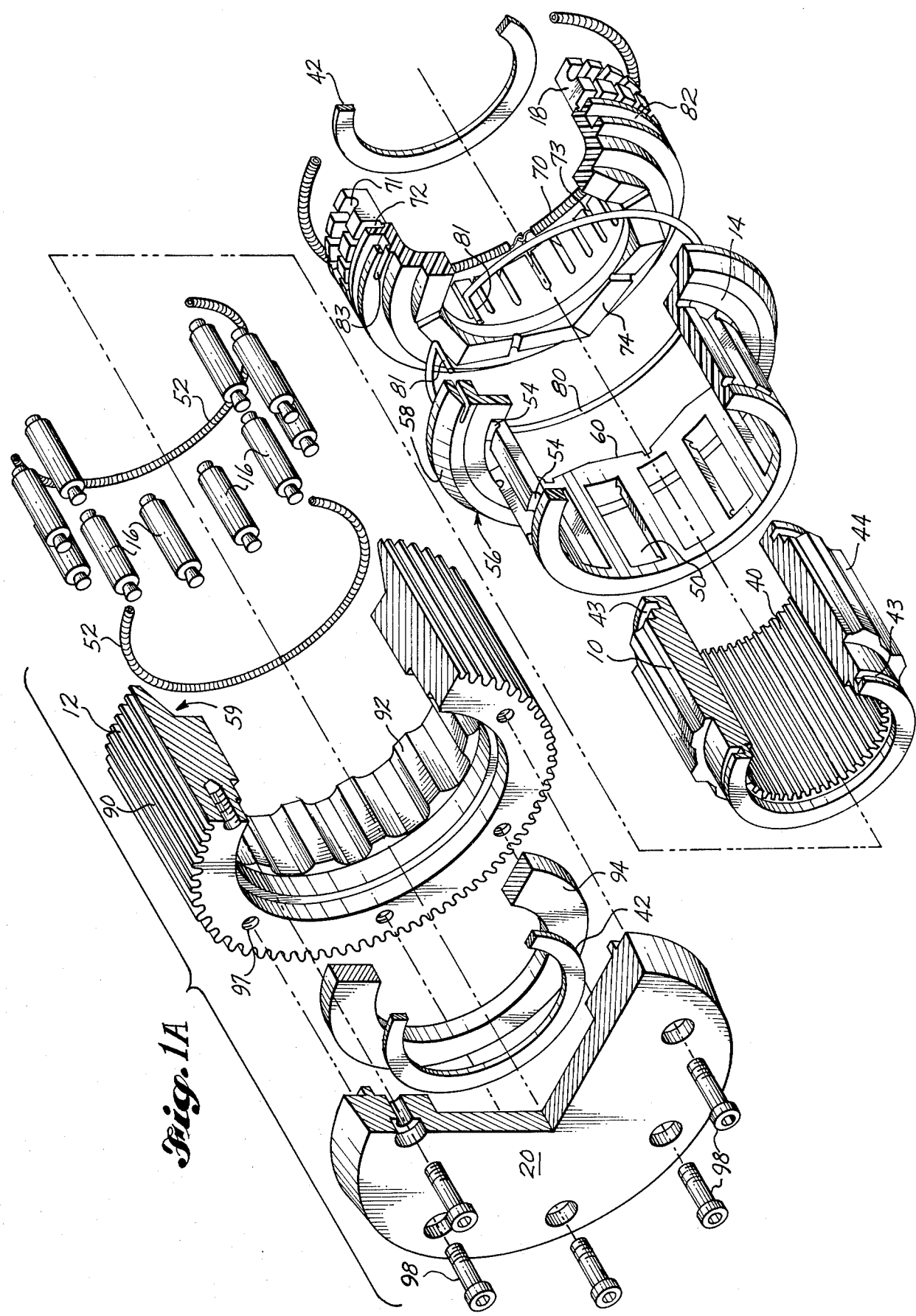
FIG. 1A is an exploded perspective view of one embodiment of a typical roller locking clutch according to the present invention.
Figure 2:
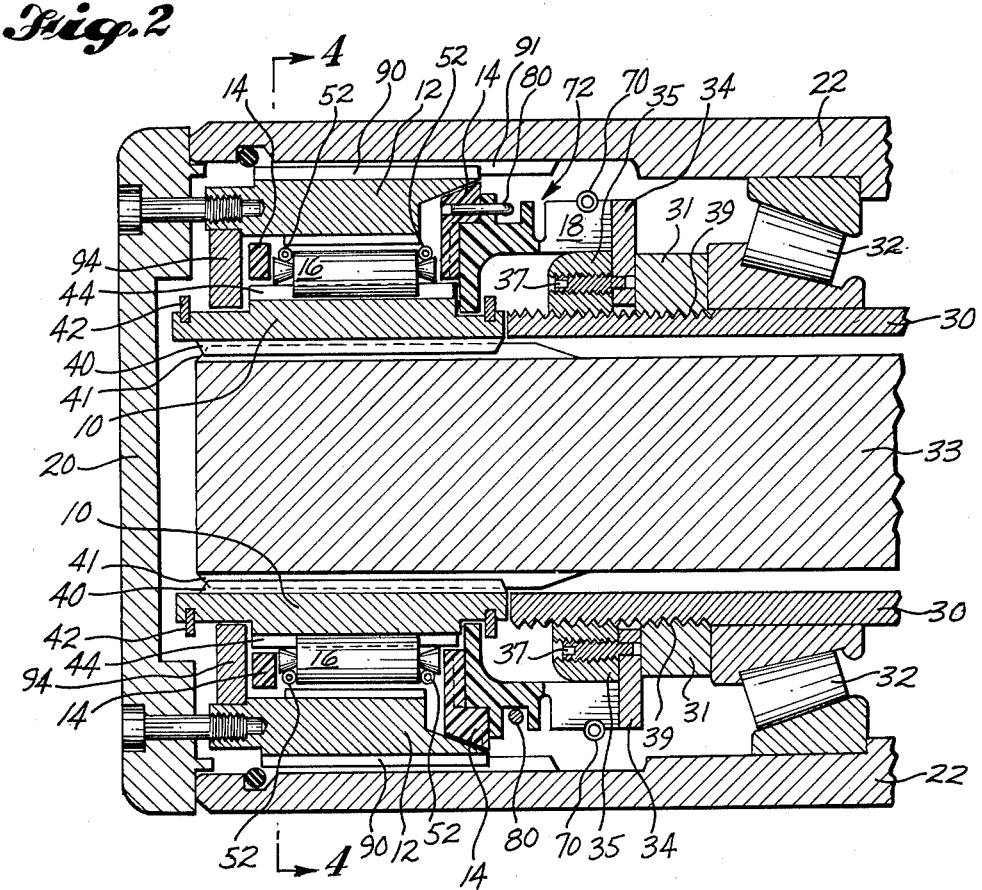
FIG. 2 is a sectional view of a typical roller locking clutch according to the present invention, showing the axle shaft and wheel hub in an unlocked condition.
Figure 3:
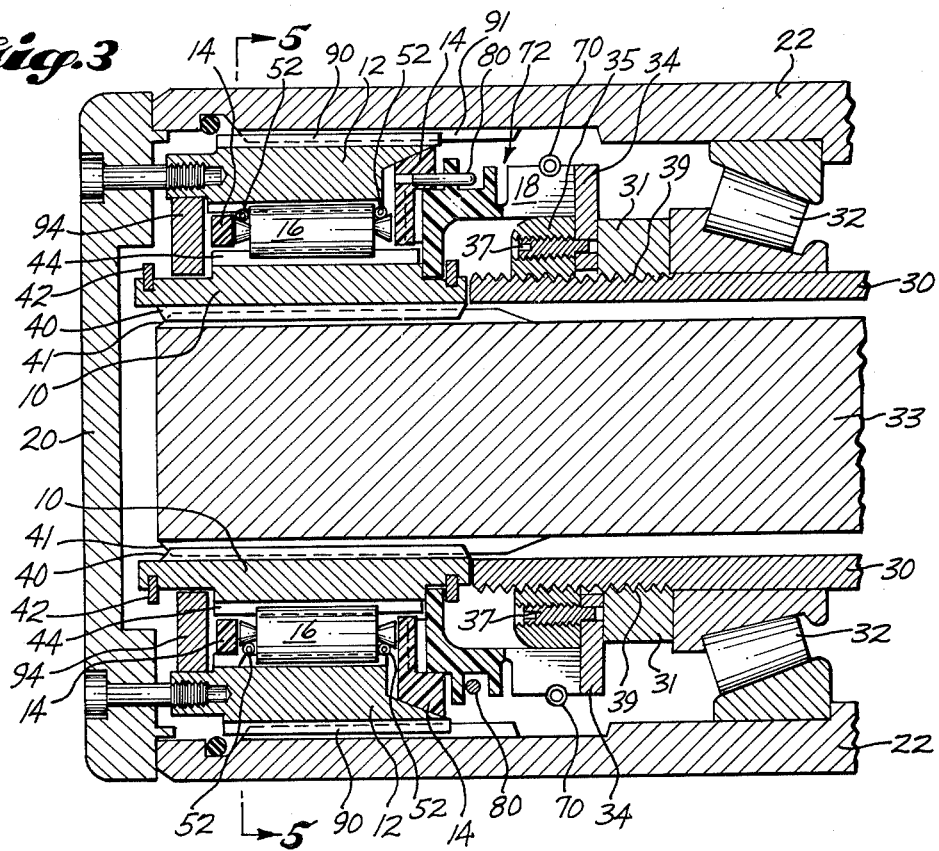
FIG. 3 is a sectional view of a typical roller locking clutch according to the present invention, showing the axle shaft and wheel hub in a locked condition.
Figure 1B:
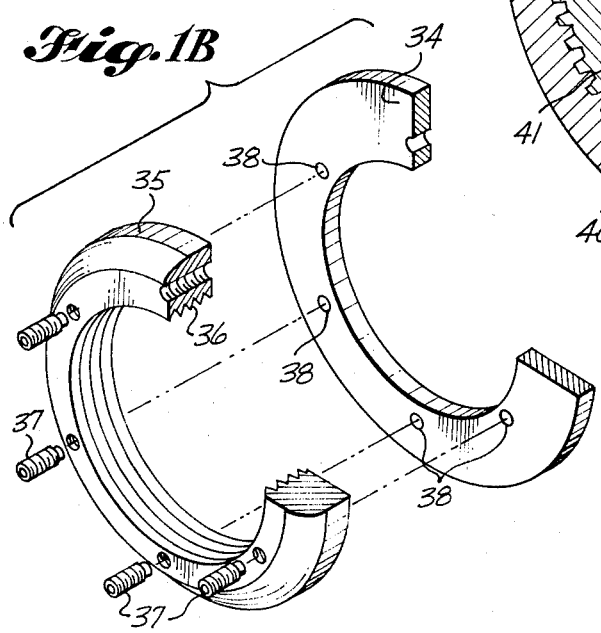
FIG. 1B is an exploded perspective view, constituting a continuation of FIG. 1A, and showing still further members of a typical roller locking clutch according to the present invention.

In one embodiment of the present invention, as shown in FIGS. 1-3, such a roller locking clutch comprises an axle shaft hub 10 coaxially disposed about an axle shaft 33, an outer body 12 coaxially disposed about the axle shaft hub 10 and in a spaced apart relationship therefrom, a cage 14 containing a plurality of rollers 16 therein and disposed between the axle shaft hub 10 and outer body 12, and a drag shoe member 18 coaxially disposed about the axle shaft and in slidable contact with the axle shaft hub 10 and in cammed engagement with the cage 14. A cover plate 20 is secured to the outer body 12, and together with the wheel hub 22 (see FIGS. 2 and 3) forms a protective enclosure for the axle shaft hub 10, the cage 14 and the drag shoe 18.

With reference to FIGS. 2 and 3, a spindle 30 is coaxially disposed about a portion of the axle shaft 33 and is in a spaced apart relation thereto. The spindle 20 is rigidly secured to the vehicle and does not rotate with respect to the axle shaft 33 or the wheel hub 22. The wheel hub 22 is rotatably engaged to the spindle 30 by bearing 32. Bearing 32 is prevented from coaxial movement along the spindle 30 by nut 31 threaded to spindle 30. The wheel hub 22, spindle 30, nut 31, and bearing 32 are shown as part of the four-wheel drive vehicle or the like and are not of themselves part of the present invention.

A thrust or lock washer 34 (see also FIG. 1B) is coaxially and slidably disposed about spindle 30 and abuts nut 31. A spindle drag nut 35 is coaxially disposed about spindle 30 and is secured from rotation thereon by a plurality of threads 36 circumferentially and coaxially disposed along the inside surface of the spindle drag nut, and by a corresponding plurality of threads 39 disposed circumferentially and coaxially about a portion of the outside surface of spindle 30. The lock washer 34 is secured to the spindle drag nut 35 by a plurality of set screws 37 in combination with a plurality of threaded holes 38 within lock wash 34. In this manner both the lock wash 34 and spindle drag nut 35 are prevented from rotation about the spindle 30. It is to be understood however, that although the spindle drag nut 35 and lock wash 34 are secured from further rotation about the spindle 30 by the plurality of set screws 37, other means, such as the use of threads disposed along the inside surface of the spindle drag nut and off set from those disposed along the spindle may be used to practice the invention.

The axle shaft hub 10 is coaxially disposed about a portion of the axle shaft 33 and is in engagement therewith by means of a plurality of splines 40 circumferentially disposed coaxially along the inside surface of the axle shaft hub 10, and a corresponding plurality of splines 41 coaxially disposed about a portion of the outside surface of the axle shaft 33. A plurality of circular clamps 42, disposed circumferentially within raceways 43 located at either end of the axle shaft hub 10, secure the axle shaft hub, the drag shoe member 18, the cage 14, and the rollers 16 to the outer body 12. The axle shaft hub 10 has a plurality of grooves 44 disposed circumferentially and coaxially around a portion of its outside surface. The plurality of grooves 44 have a radium slightly larger than the radius of the plurality of rollers 16, thereby permitting the rollers to travel up the sides or edges of the grooves 44 and engage the outer body 12 as will be more fully discussed below.

A cage 14 is coaxially disposed between the axle shaft hub 10 and outer body 12. The cage 14 contains a plurality of openings or windows 50 having a plurality of rollers 16 therein. The rollers 16 are urged from radial movement away from the cage by a plurality of roller springs 52 disposed on either end of the rollers 16 and contained within a plurality of roller spring grooves 54 disposed circumferentially around the cage 14. In the preferred embodiment, the cage 14 is in a slightly spaced apart relation with respect to the axle shaft hub 10, with the plurality of rollers 16 engaging the axle shaft hub at the bottom of the plurality of grooves 44 therein (see FIGS. 4–5). The cage 14 has a flanged member 56 at one end thereof, with the flanged member having a sloping portion 58 circumferentially around its outside surface and a plurality of slightly sloped linear cam ramps 60 (as described below) circumferentially around its inside surface. The sloping surface 58 is in slidable engagement with a corresponding sloping surface 59 disposed circumferentially around the inside surface of the outer body 12 as is also more fully described below. In the preferred embodiment, surface 58 is at a slope of approximately 20 degrees and is linear. Cage 14 is typically constructed from a moderate friction plastic material, such as glass filled nylon 6/6 or the like which comprises about 30 percent glass fiber.

A drag shoe 18 is coaxially disposed about the axle shaft 33, is in slidable contact with a portion of the axle shaft hub 10 and the spindle drag nut 35, and is in cammed engagement with the cage 14. The drag shoe 18 is maintained in substantially constant frictional contact with the spindle drag nut 35 through a garter spring 70 circumferentially disposed around the drag shoe and maintained in garter spring groove 71 within the drag shoe. The drag shoe 18 has a circumferential relief mill 72 and a plurality of axial relief mills 73 disposed therein to facilitate the bending or flexing of the drag shoe toward the spindle drag nut 35 as relative wear occurs between these respective members. The drag shoe 18 has a plurality of slightly sloped linearly shaped cam surfaces 74 at one end thereof (see FIG. 1A) which are in a cammed engagement with a corresponding plurality of slightly sloped linearly shaped cam surfaces 60 disposed upon the inside surface of the flange 56 on cage 14. In the preferred embodiment, the drag shoe 18 is constructed from a plastic material, typically LNP nylon 6/6 comprising 15 percent Teflon and 30 percent carbon fiber and known as RCL 4036.

A centering spring 80, having a plurality of horns 81 thereon, is disposed circumferentially around drag shoe 18 and contained in groove 82 within the drag shoe. The plurality of horns 81 extend through groove 83 within drag shoe 18 and groove 84 within flange 56 and urge the cam surfaces 60 and 74 in a neutral or uncammed relationship with respect to each other.

The outer body 12 is coaxially disposed above the axle shaft hub 10 and cage 14 and in a spaced apart relation therefrom. The outer body 12 is splined to the wheel hub 22 by a plurality of splines 90 extending axially and circumferentially around the outside surface of the outer body 12 and a corresponding plurality of splines 91 circumferentially disposed along the inside surface of wheel hub 22 (see FIGS. 2–3). A plurality of grooves or flutes 92 are disposed circumferentially around the inside surface of the outer body 12. In the preferred embodiment, the flutes 92 are semicircular shaped having a radium equal to that of the plurality of rollers 16. The outer body 12 has a sloped surface 50 at one end thereof which is in frictional engagement with the sloped surface 58 on flange 56 disposed on cage 14. A bearing washer 94 is disposed circumferentially within the outer body 12 at the other end thereof and maintains the outer body and the axle shaft hub 10 in a spaced apart relation. A cover 20 is secured to the other end of the outer body 12 by a plurality of screws 98 in combination with a plurality of threaded holes 97 within the outer body. The cover 20 and wheel hub 22 provide a protective enclosure for the axle shaft hub 10, the outer body 12, and cage 14.

Figure 4:
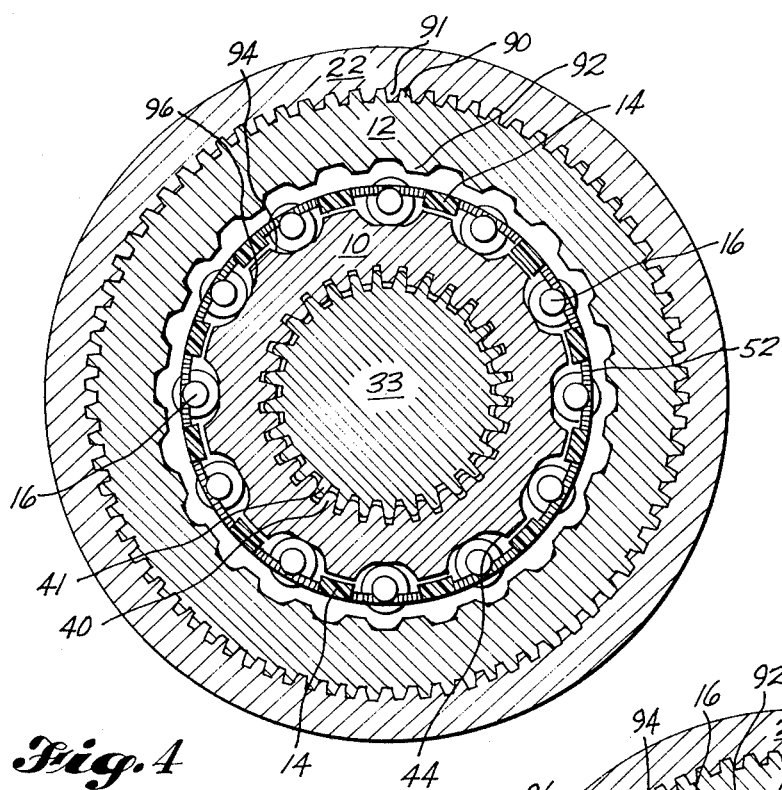
FIG. 4 is a cross-sectional view of a typical roller locking clutch taken along lines 4—4 of FIG. 2.
Figure 5:
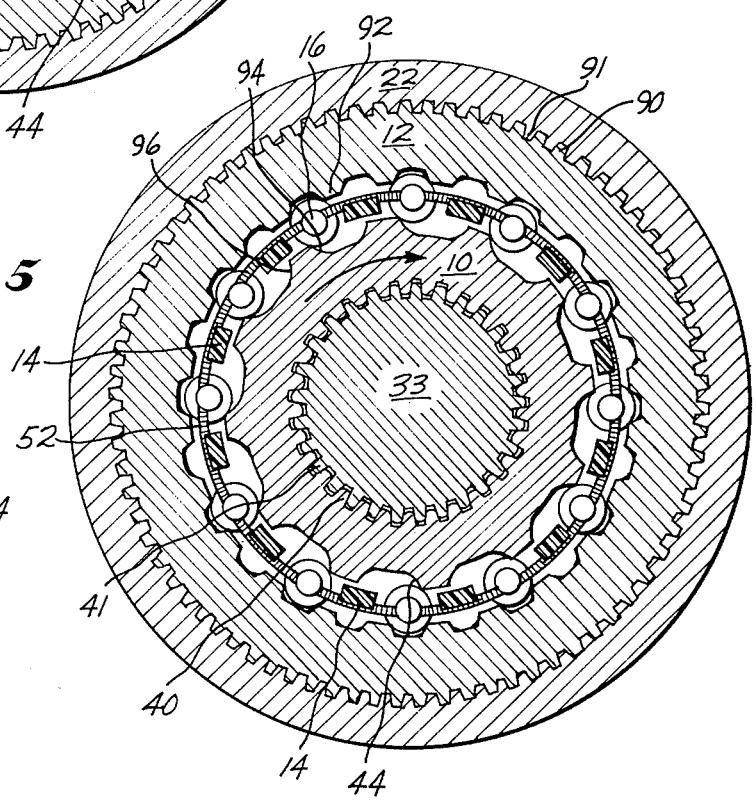
FIG. 5 is a cross-sectional view of a typical roller locking clutch taken along lines 5—5 of FIG. 3.

With reference to FIGS. 4 and 5, the operation of the roller locking clutch in the free run, acceleration, and engine compression braking modes are next described.

FREE RUN MODE

In the free run mode, the axle shaft 33 is disconnected from rotational movement, and the axle shaft hub 10 being in a splined engagement with the axle shaft through splines 40 and 41 is similarly disconnected. The drag shoe 18 being slidably engaged with the axle shaft hub is stationary. The plurality of rollers 16 contained within cage 14 are urged to a position at the bottom of grooves 44 within the axle shaft hub 10 by the plurality of roller springs 52 and centering spring 80. The wheel (not shown) and wheel hub 22 are rotating in a direction corresponding to the direction of travel of the vehicle, and at a rate proportional to the speed of the vehicle. The outer body 12, being in a splined engagement with the wheel hub 22 through splines 90 and 91, is similarly rotating in the same direction and at the same speed as the wheel hub 22. Cage 14 and outer body 12, being in slidable contact with each other through sloping surfaces 58 and 59, generate a torque which has a tendency to axially displace and rotate the cage with respect to the drag shoe 18, thereby causing the rollers 16 to climb the edges of the grooves 44 and engage the flutes 92 in the outer body 12. This displacement is prevented by the centering spring 80 which provides a counter or preload torque and urges the cam surfaces to a neutral or uncammed position. In the preferred embodiment, the preload torque provided by the centering spring is approximately 5 inch pounds. Since the diameter of the rollers 16 is smaller than the annular space between the axle shaft hub 10 and the outer body 12, the outer body 12 moves freely past the plurality of rollers 16 and the stationary cage 14.

ACCELERATION MODE

In the acceleration mode, both the axle shaft 33 and the wheel hub 22 are free to rotate in a direction corresponding to the direction of travel of the vehicle. With reference to FIG. 5, as the axle shaft 33 begins to rotate in the clockwise direction, the axle shaft hub 10, being splined to the axle shaft, similarly rotates in the clockwise direction. Cage 14 and the rollers 16 therein initially rotate with the axle shaft hub 10. However, this rotation is restricted by the inherent torque generated by the drag shoe 18 as it slidably contacts both the drag shoe nut 35 and the axle shaft hub 10. In the preferred embodiment, the garter spring 70 in combination with the drag shoe 18 produces approximately 15 inch pounds of torque, which is sufficient torque to cause the plurality of slightly sloped cam surfaces 60 and 74 to separate with respect to each other. This separation produces frictional engagement between sloping surfaces 58 and the corresponding sloping surfaces 59 within the outer body 12. This frictional engagement causes the axle shaft hub to drive the rollers radially up the lagging edges 94 into contact with the outer body. As the axle shaft hub 10 rotates with respect to the outer body 12, the plurality of rollers 16 are brought into contact with the flutes 92 within the outer body thereby wedging the rollers between the plurality of flutes 92 and the lagging edges 94 of the axial grooves 44, producing a lockup between axle shaft hub 10 and outer body 12. Additional driving torque imparted to axle shaft 33 is thereafter coupled through axle shaft hub 10 and the plurality of rollers 16 to the outer body 12 and wheel hub 22. This lockup condition continues as long as the axle shaft 33 attempts to rotate as fast as, or faster than the wheel hub 22.

ENGINE COMPRESSION BRAKING MODE

In the braking mode, the rotational speed of the axle shaft hub 33 is momentarily less than the rotational speed of the wheel hub 22, as occurs when the throttle of the vehicle is suddenly released. With reference to FIG. 5, this difference in rotational speed allows the outer body 12 and the cage 14, which is in frictional engagement with the faster rotating outer body, to pull the rollers 16 down the lagging edges 94 of grooves 44, to the bottom and up the leading edges 96 of the grooves and into contact with the flutes 92. In this situation, the rollers 16 become wedges between the leading edges 96 of the grooves 44 and the flutes 92, thereby locking the axle shaft hub 10 to the outer body 12. As in the acceleration mode, subsequent torque generated by axle shaft 33 is coupled through axle shaft hub 10, the plurality of rollers 16, and the outer body 12 to the wheel hub 22. Since the axle shaft attempts to rotate slower than the rotational speed of the wheel hub 22 and is in a locked condition thereto, the wheel hub 22 rotates at the slower rotational speed of the axle shaft 33.

It will be obvious to those skilled in the art to which this invention is addressed, that the invention may be used to advantage in any situation where it is necessary to maintain a locked condition between rotating driving and driven members during periods of vehicle braking. Therefore, it is also to be understood by those skilled in the art that various changes, modification, and omissions in form and detail may be made without departing from the spirit and scope of the present invention as defined by the following claims.

What is claimed is:

1. In a clutch for use between rotational, concentric driving and driven members, with one of said members having a plurality of axially extending grooves therein opening radially outwardly toward said other member, and with each of said grooves having a roller disposed therein, said clutch comprising:
    (a) a cage rotatably disposed between said concentric members in slidable contact with said driven member, said cage having said plurality of rollers therein;
    (b) a spindle drag nut disposed between said concentric members in stationary spaced apart relationship thereto;
    (c) a drag shoe slidably movable over said spindle drag nut and one of said members and in a cammed engagement with said cage such that as said drag shoe moves over said drag nut and said member upon initial rotation of said member, the torque generated therebetween axially displaces and rotates said cage into frictional engagement with said driven member moving said rollers radially out of said grooves up on one edge thereof and into contact with said driven member locking said driven member to said driving member whenever said driving member attempts to rotate faster than said driven member;
    (d) means responsive to the driven member rotation to displace each of said rollers from said one edge to a position on the opposite edge of its groove and into contact with said driven member, thereby locking said driven member to said driving member when said driving member attempts to rotate slower than said driven member.

2. The clutch of claim 1, wherein said drag shoe and said cage are in cammed engagement by action of a plurality of slightly sloped linear cam surfaces.

3. The drag shoe of claim 1, further comprising:
(a) a plurality of axially extending mills therein;
(b) a circumferentially extending relief mill disposed thereon; and
(c) a garter spring extending circumferentially around the outside surface of said drag shoe and disposed above said spindle drag nut such that, as relative wear occurs between said nut and said shoe, said mills in combination with said spring urge said shoe against said nut thereby maintaining substantially constant drag therebetween.

4. The clutch of claim 1, further comprising a centering spring disposed circumferentially around said drag shoe, said spring having a plurality of horns thereon, said horns engaging said cage and uring said cage and said drag shoe into uncammed relationship.

5. The clutch of claim 1, wherein said means to displace said rollers from said edge to a position on the opposite edge comprises a plurality of flutes axially and circumferentially disposed upon the other of said concentric members, the said flutes extending radially toward said grooves.

6. The clutch of claim 5, wherein said flutes comprise a plurality of grooves having a radius equal to that of said rollers.

7. The clutch of claim 1, wherein said cage is fabricated from a plastic material comprising about thirty percent glass fiber.

8. The clutch of claim 1, wherein said drag shoe is fabricated from a plastic material comprising about fifteen percent Teflon and about thirty percent carbon fiber.

* * * * *